US010677959B2

(12) United States Patent
Eccles et al.

(10) Patent No.: US 10,677,959 B2
(45) Date of Patent: Jun. 9, 2020

(54) METHOD OF AND APPARATUS FOR CALCULATING UCS AND CCS

(71) Applicant: Reeves Wireline Technologies Limited, Leicestershire (GB)

(72) Inventors: David Eccles, Sheffield (GB); Jian Huang, Houston, TX (US); Ovunc Mutlu, Houston, TX (US)

(73) Assignee: REEVES WIRELINE TECHNOLOGIES LIMITED (GB)

( * ) Notice: Subject to any disclaimer, the term of this patent is extended or adjusted under 35 U.S.C. 154(b) by 1774 days.

(21) Appl. No.: 14/174,476

(22) Filed: Feb. 6, 2014

(65) Prior Publication Data

US 2015/0219791 A1 Aug. 6, 2015

(51) Int. Cl.
*G01V 99/00* (2009.01)
*E21B 49/00* (2006.01)

(52) U.S. Cl.
CPC ............ *G01V 99/00* (2013.01); *E21B 49/006* (2013.01)

(58) Field of Classification Search
CPC ........... G01V 1/40; G01V 9/00; E21B 49/006
(Continued)

(56) References Cited

U.S. PATENT DOCUMENTS

| 4,914,591 | A | 4/1990 | Warren | |
|---|---|---|---|---|
| 7,555,414 | B2 * | 6/2009 | Calhoun | ............... E21B 49/006 703/2 |
| 2006/0131074 | A1 * | 6/2006 | Calhoun | ............... E21B 49/006 175/50 |

FOREIGN PATENT DOCUMENTS

| WO | 2006065603 | A2 | 6/2006 | |
|---|---|---|---|---|
| WO | 2009002872 | A1 | 12/2008 | |
| WO | WO2009002872 | | * 12/2008 | ............... G01V 1/40 |

OTHER PUBLICATIONS

Combined Search and Examination Report received in corresponding Great Britain Application No. GB1413755.8, dated Feb. 3, 2015, 5 pages.

* cited by examiner

*Primary Examiner* — Andrew Schechter
*Assistant Examiner* — Kaleria Knox
(74) *Attorney, Agent, or Firm* — Blank Rome, LLP (57) ABSTRACT

A method of calculating the unconfined compressive strength (UCS) of subterranean rock having a borehole formed or being formed therein comprises the steps of:
  (a) establishing or accessing a set of input variables pertaining to characteristics of the rock and the geographical region in which the rock exists;
  (b) allocating to each of a plurality of mnemonic types each representing a respective UCS calculation expression and contained within a database of UCS calculation curves up to one said input variable in the form of a data element or up to one series of said input variables in the form of a data curve the allocation taking place on the basis of identity of each said input variable or data curve, as applicable, to which a said UCS calculation curve is allocated to a variable of a said UCS calculation curve (herein "curve variables");
  (c) dividing the set of allocated UCS calculation curves according to one or more respective zones of the rock to which they pertain and calculating a resultant curve;
  (d) as necessary filtering the resulting set of UCS calculation curves to reduce the number of allocated UCS calculation curves to a single UCS calculation curve for each zone;
  (e) repeating step (d) in respect of any further said zones of the rock;

(Continued)

(f) when step (d) is repeated one or more times, combining the resulting single curves allocated to the respective zones so as to create a composite UCS calculation curve; and (g) using the composite UCS calculation curve to calculate UCS values at one or more locations in the borehole.

24 Claims, 6 Drawing Sheets

(58) Field of Classification Search
USPC .................................................. 702/6, 11
See application file for complete search history.

METHOD OF AND APPARATUS FOR CALCULATING UCS AND CCS

FIELD OF THE INVENTION

The invention relates to a method of and apparatus for calculating unconfined compressive strength (UCS) and confined compressive strength (CCS) of rock.

BACKGROUND OF THE INVENTION

UCS and CCS are important criteria in the geological assessment of subterranean formations (rock), especially in the extraction of subterranean oil, gas, water and other minerals. One way of several in which UCS and CCS measurements are used in these industries is to determine the extent to which a particular formation can be drilled before it becomes necessary to replace part or all of a drill bit used for this purpose. The fundamental selection of drill bit type (e.g. in terms of surface material, geometry and other parameters) can also be assisted through knowledge of UCS and CCS data.

Broadly stated, UCS is a measure of the strength of rocks and cohesive soils under no confining pressure, and for reasons such as those given above is an important parameter in the mining, drilling, water extraction, oil and gas industries and to which the invention pertains in particular.

UCS traditionally was measured using a laboratory test at atmospheric pressure based on e.g. core samples. More recently dynamic logging measurements have been used to calculate UCS. This avoids the problem, that may be extant in e.g. a borehole in an oil or gas field, of recovering a rock sample to a surface location for testing.

UCS is known generally to understate the true compressive strength of rock in any event, because it cannot take account of the known strengthening effect of confinement of subterranean rock caused by overburden and a number of other geological factors. Partly for this reason CCS is usually seen as a more realistic measure of rock hardness in drilling and well logging operations.

Conventionally in the logging of oil and gas fields a single expression is used to establish UCS once log data such as sonic log data are obtained. It is known that numerous expressions potentially are available for calculating UCS but the use of a single expression seems to reflect the significant perceived difficulty in allocating expressions correctly in a field situation, in which rapid and reliable UCS and CCS calculation may be required. The most commonly used expression format however does not take account of variations in lithology, location, available input variables and data quality.

The invention seeks to improve the accuracy with which UCS and CCS values may be estimated or calculated at high speed, as may be required for instance during a logging-while-drilling (LWD) operation or before a drilling or other subsurface operation commences. At such times a drilling engineer may require rapidly updated rock strength information such as UCS or more likely CCS data, such that he/she can make instantaneous decisions about variables such as drilling rates of penetration, drill rotation speeds, drilling directions, drillhead angles/orientations, drillhead cutter selections, cutter materials or specifications and drill wear gradings (related to drill service lives) in prevailing conditions. Accurate UCS and CCS data can additionally be used to assist in selection decisions relating to downhole equipment other than drill tools, and wellbore stability issues

SUMMARY OF THE INVENTION

According to the invention in a broad aspect there is provided a method of calculating the unconfined compressive strength (UCS) of subterranean rock having a borehole formed or being formed therein, the method comprising the steps of:

(a) establishing or accessing a set of input variables pertaining to characteristics of the rock and the geographical region in which the rock exists;

(b) allocating to each of a plurality of mnemonic types each representing a respective UCS calculation expression and contained within a database of UCS calculation curves up to one said input variable in the form of a data element or up to one series of said input variables in the form of a data curve the allocation taking place on the basis of identity of each said input variable or data curve, as applicable, to which a said UCS calculation curve is allocated to a variable of a said UCS calculation curve (herein "curve variables");

(c) dividing the set of allocated UCS calculation curves according to one or more respective zones of the rock to which they pertain and calculating a resultant curve;

(d) as necessary filtering the resulting set of UCS calculation curves to reduce the number of allocated UCS calculation curves to a single UCS calculation curve for each zone;

(e) repeating step (d) in respect of any further said zones of the rock;

(f) when step (d) is repeated one or more times, combining the resulting single curves allocated to the respective zones so as to create a composite UCS calculation curve; and (g) using the composite UCS calculation curve to calculate UCS values at one or more locations in the borehole.

Such a method may be carried into effect using a programmable device such as a digital computer. When so carried out the accuracy of UCS calculations and estimations may be improved compared with the prior art, while permitting the near-real time generation of UCS values such that e.g. a drilling engineer or similar professional may make use of them as summarised above either in preparation for drilling operations or in LWD situations while a borehole is undergoing creation in the rock.

Preferred embodiments of the method additionally include the steps (h) of developing a confined compressive strength (CCS) curve from the composite UCS calculation curve, and (i) using the CCS curve to calculate CCS values at one or more locations in the borehole. Such a refinement of the method renders it particularly suitable for the assessment of downhole or other subterranean rock strength values.

Also preferably the method of the invention includes the step of (j) storing, printing, transmitting or displaying one or more resulting UCS curves, or resulting CCS curves or calibration information for one or more UCS and/or CCS curves.

In particular but not exclusively the method of the invention is of benefit during LWD operations. Partly for this reason preferably the step (a) of establishing or accessing a set of input variables includes (k) operating one or more logging tools in the borehole in order to record log data that are the input variables or from which the input variables are derivable.

When LWD is practiced preferably the step (k) of operating one or more logging tools occurs while drilling of the borehole also takes place. However the method also may be practised in respect of geophysical data obtained otherwise than by an LWD process.

Conveniently the step (b) includes one or more of:

(b1) assigning the up to one said input variable in the form of a data element or a series of said input variables in the form of a data curve to each of a plurality of mnemonic types each representing a respective measurement type;

(b2) comparing a list of available internal mnemonic data with the mnemonic types required for each UCS calculation expression;

(b3) determining whether all required mnemonic types are present and if so adding the UCS calculation expression to a list of valid expressions which can be used to calculate UCS;

(b4) based on a populated mnemonic type database resulting from step (b3), calculating any other possible data measurements which can be used in UCS calculation expressions;

(b5) using between zero and three conditional logic statements to establish whether one or more said UCS calculation expressions is/are valid in calculating UCS in an environment of interest; and (b6) using a reliability index in relation to the allocation of each UCS calculation curve in order to rank the quality of the UCS expressions.

In one preferred embodiment of the method of the invention the aforesaid reliability index is such that the UCS/CCS expressions are split up on a scale of low, medium and high reliability based on correlation of each expression with available experimental, field or off-set well data. This includes looking at the procedure used to generate the expressions, the statistical variation of the result and looking at data in combination with other available information. This process ensures selection of the most reliable equation specific to a certain location, rock type and based on available input data.

Conveniently preferred embodiments of the method of the invention includes the step of (b7) calibrating through the use of a least square fit one or more said allocated UCS calculation curves against core and/or field data. This step can assure e.g. that the scaling of the curve(s) that result from practising of the method is correct for field conditions in which the input variables are obtained to from one or more alternative data source(s).

In a further, optional refinement the method may include the step of (b8) plotting at least one said allocated UCS calculation curve before and after modification, and comparing, storing, displaying or printing the plotted curves. Such steps may be of assistance to logging engineers/log analysts, geologists and drilling engineers.

Preferably the step (c) of dividing the set of UCS/CCS expressions according to one or more respective zones of the rock to which they pertain includes defining one or more zone boundaries dependent on variations in one or more measured parameters of rock.

Alternatively the step (c) of dividing the set of input variables according to one or more respective zones of the rock to which they pertain may include defining one or more zone boundaries dependent on variations in one or more calculated or selected (by an operator) parameters of rock.

Thus the method contemplates at least two ways of "zoning" the input variables according to characteristics of the rock over a length of borehole, such that the most appropriate UCS or CCS calculation curve may be applied to each respective lithological zone which can be from one to several hundred metres thick.

Preferably the method includes applying one or more inequality constraints to one or more calculated UCS, or as appropriate CCS values to filter out values that are out of bounds.

In preferred embodiments of the method of the invention one or more said calculated UCS and/or CCS values is input in real time or near-real time into a drilling calculation selected from the list including wellbore stability, wellbore trajectory and wellbore strengthening. Thus the method may in a practical way be linked to LWD selection and command decisions.

Similarly one or more said calculated UCS and/or CCS values may be input in real time or near-real time to a determination of hydraulic fracture stage locations in a region of rock; and/or one or more said calculated UCS and/or CCS values may be input in real time or near-real time to a determination selected from drill bit selection and drilling efficiency.

The foregoing steps may be completed in accordance with an aspect of the invention while drilling of rock e.g. to form a borehole is taking place.

In yet a further optional refinement the method may include the step of (l) calculating one or more values of stress based on rock formation anisotropy. The method also may include the step of (m) updating the database of UCS calculation curves based on the results of any of the foregoing aspects of the invention.

As mentioned the method may be performed using a suitably programmed device such as a digital computer. The invention additionally is considered to reside in such a device when programmed to carry out a method as defined herein and/or including stored therein e.g. in a memory one or more UCS or CCS values resulting from practising of the method.

BRIEF DESCRIPTION OF THE DRAWINGS

There now follows a description of preferred embodiments of the invention, by way of non-limiting example, with reference being made to the accompanying drawings in which.

DETAILED DESCRIPTION OF THE DRAWINGS

Figure 1:
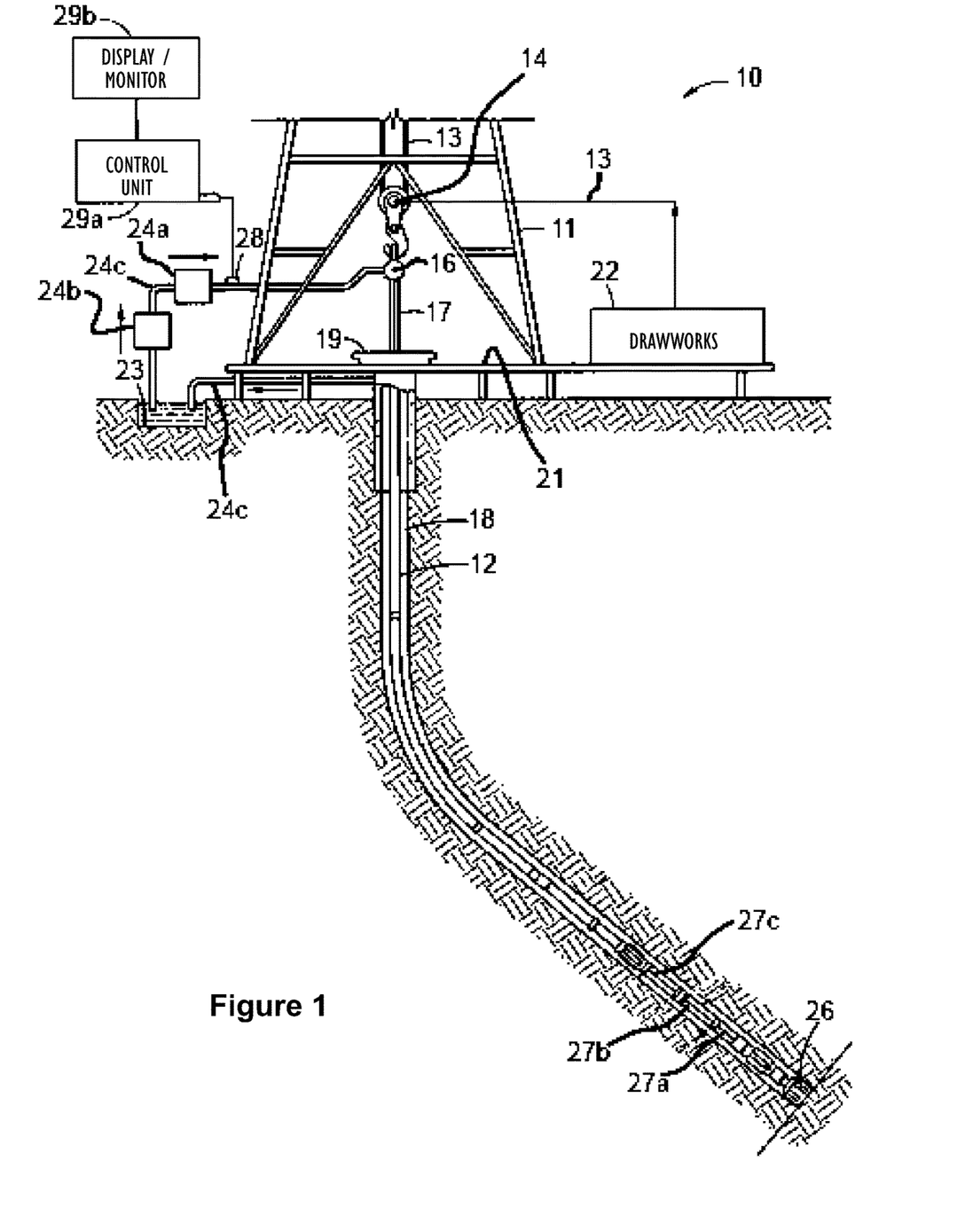
FIG. 1 is a schematic representation of a logging while drilling (LWD) operation the data generated by which is suitable for treatment in accordance with the method of the invention.

Referring to the drawings FIG. 1 shows in schematic, non-limiting form a logging-while-drilling activity. In FIG. 1 a land-based drilling rig 10 includes a derrick 11 of a per se known kind supporting a drillstring 12 by way of a drill line 13 acting via a travelling block 14, swivel 16 and kelly drive 17 all of which may be of conventional designs. The drill string extends along a borehole 18 for a distance that may be several hundred or thousand metres.

The kelly drive 17 acts via a rotary table 19 set in a drill floor 21 that also supports a motor, drill line drum and ancillary parts 22 referred to sometimes as drawworks.

Drilling mud is circulated as indicated by arrows from a mud pit 23 between the drillstring 12 and borehole 18 by way of per se known pump 24a, filter 24b and pipework 24c components. The pipework connects to the borehole via schematically shown unions at the swivel 16 and rotary table 19, also in a per se known manner.

At its downhole end inside the borehole the drillstring terminates in one or more drill bits or cutters 26. These may adopt a range of designs including but not limited to the exemplary one illustrated. Rotary drive in use of the drilling rig 10 is transferred from e.g. the motor of the draw works 22 via a chain or shaft drive to the rotary table 19 that by way of keyed engagement with the kelly drive 17 effects rotation of the drillstring 12. This in turn causes cutting of rock at the downhole end of the borehole 18. Cuttings resulting from this action are conveyed in the circulating drilling mud to the mud pit 23, where they settle for later recovery or treatment. The filter 24b prevents thus removed cuttings from being conveyed to the drill bit 26 unless an injection of cuttings is required (in which case the filter 24b may be temporarily bypassed or disconnected from the pipework 24c).

Between the drill bit 26 and the remainder of the drillstring 12 a plurality of logging sondes or subs 27 are connected in an in-line fashion.

In the embodiment shown in FIG. 1 three subs 27a, 27b, 27c are illustrated that may be respectively a transmitter 27a, a receiver 27b and a telemetry sub 27c.

As is well known in the well logging art the transmitter 27a of the logging tool energises the rock in the vicinity of the drill bit 26. The receiver 27b receives energy that has been altered in some way by the formation; and the telemetry sub 27c may contain an electronics section that conditions electrical signals generated by the receiver sonde 27b for transmission to a surface location.

One form of logging tool that is commonly used in an LWD arrangement is an acoustic logging tool, although as indicated above a range of other types is also possible. In practice the logging tool is likely to be somewhat more complicated than the simplified version illustrated.

One way, of several, in which the telemetry sub 27c can convey log data to a surface location in real time is through the generation of encrypted pulses in the drilling mud. The telemetry sub 27c may include components and drives adapted for this purpose.

The mud pulses travel in the mud to the surface where one or more pressure sensors 28 is arranged to detect them in the pipework 24c.

The pressure sensor(s) 28 generate electrical signals that are conveyed to and processed in a control unit such as a computer 29a the display or monitor 29b of which displays the resulting log data in a form familiar to a log analyst or drilling engineer.

The log data in an LWD operation as noted above very usefully can be UCS or CCS data. Also as noted the known prior art techniques are inadequate for accurately calculating UCS and CCS values from the signals generated by the logging parts of the drillstring. The invention beneficially improves the accuracy of UCS and CCS calculations both when the requirement for them arises in an LWD situation as described above and also in a variety of other circumstances.

Thus LWD represents one activity of several in which use of the method of the invention is of benefit. As will be apparent to the person of skill in the art any method that improves the accuracy with which UCS, and more particularly CCS, data values can be obtained rapidly (preferably in near-real time) will be of considerable assistance to drilling engineers who are responsible for LWD operations.

The method of the invention is however also of more general applicability. This is because the method improves the quality of calculated or estimated UCS and CCS values even when there is not a need to control a drill bit in real time. Moreover as noted the method permits the rapid calculation of such values when this is required.

For the further avoidance of doubt the drilling rig of FIG. 1 is exemplary of one way, of many, in which drilling and logging equipment may be embodied. As a result the method of the invention is applicable when for example a logging tool is operated entirely independently of a drilling operation.

Moreover the drilling equipment used, if the logging equipment is used in conjunction with it, may within the scope of the invention differ significantly from the arrangement of FIG. 1.

The method described herein in addition may be used to re-process existing log data in order to obtain accurate UCS and CCS information from it.

An initial stage of the method involves the acquisition or accessing of data pertaining to a borehole or other formation feature the UCS or CCS of which it is required to know. Such data preferably are acquired through operation of a logging tool in the formation, although other ways of accessing or acquiring data will be known to the person of skill. Such aspects are within the scope of the invention.

The logging tool when used as part of the method may be of a wide range of types, including but not limited to per se known sonic, resistivity, image, density/porosity (neutron), gamma and NMR logging tools. Logging tools may be used in combination with one another such that a length of borehole may be logged in more than one way as a logging toolstring (that as noted may or may not be part of an LWD arrangement) passes along it in order to acquire log data. Partly for this reason, and partly because of the versatility of many logging tool designs, a set of log data relating to a particular length of borehole may relate to a very wide range of attributes of the formation.

Indeed the overall number of attributes that can be defined or described using log data probably runs in to the hundreds, if not thousands, of different kinds.

The known equations used to calculate UCS and CCS values also are highly diverse, with many of them requiring as input variables different sets of data types. One significant reason it is believed that inappropriate calculation expressions have been used in the past is the fact that the data value types obtainable from the logs do not necessarily match the input variable types needed to operate the expressions. As a result users have confined their work to a very limited range of expressions that are useable with minimal input variable sets and hence are likely to be workable over a range of data sets from a range of logging tool types.

This approach however leads to inaccuracies in the calculation of UCS and CCS values since it takes little or no account of prevailing geological factors. Moreover the use of a single, or at most a limited range of, calculation expressions means that no account is taken of how geological factors may vary, and hence influence the UCS and CCS values, from place to place in a borehole.

As noted above the invention seeks to solve prior art drawbacks such as the foregoing.

Figure 2:
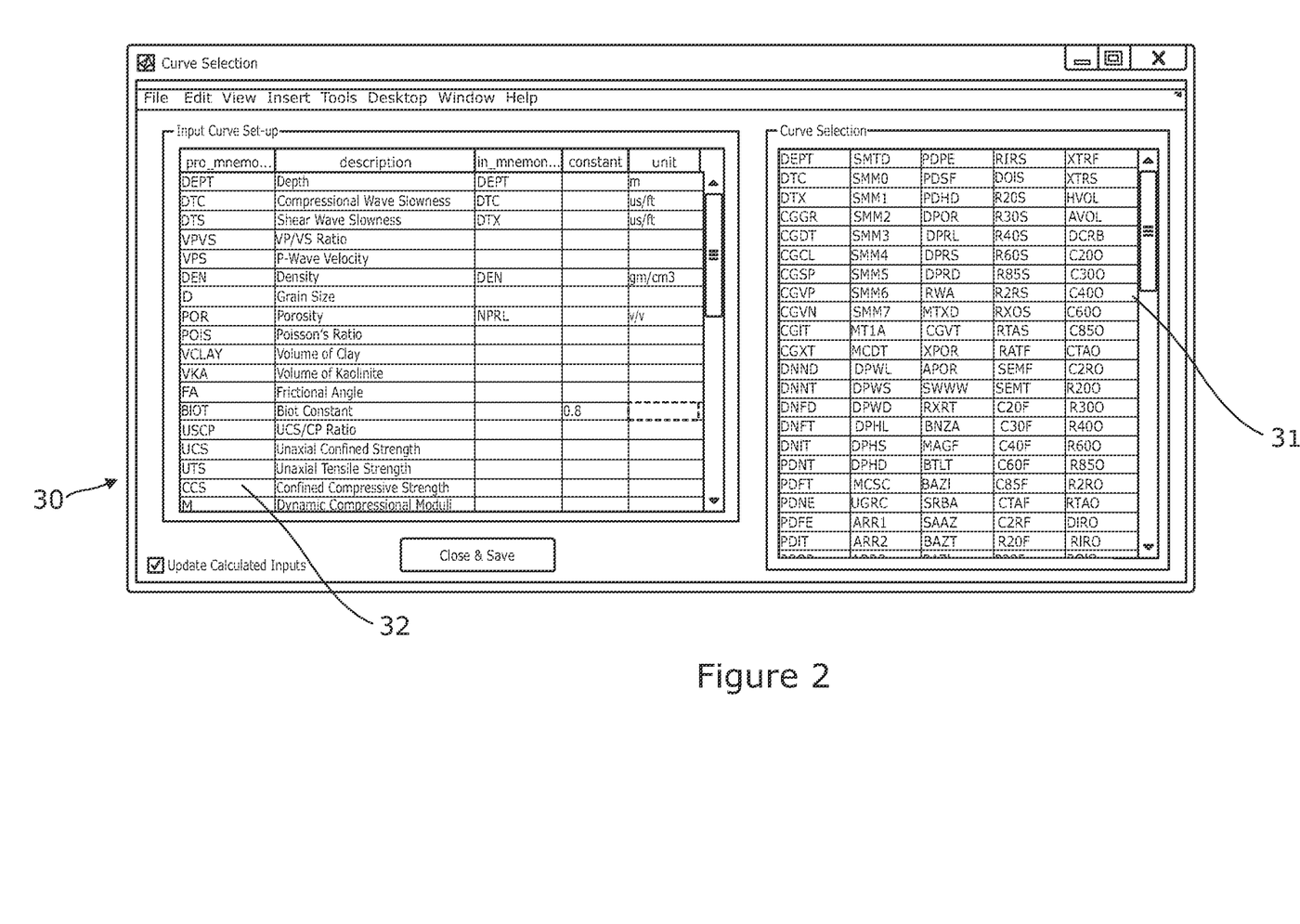
FIG. 2 is an example of the manipulation of the use of input variables, in the method of the invention, resulting from a logging operation such as that depicted in FIG. 1.

FIG. 2 shows an initial stage in the method of the invention by way of a graphical user interface (GUI) 30 through which the input variables available from log data (that as mentioned could be data from one or more than one logging tool) are matched to the internal mnemonics (expressions), or "calculation equations" as also referred to herein in which they may be used.

Thus in FIG. 2 the right hand panel 31 is a list of input variables that are derivable from signals generated by logging tools used in the borehole under investigation as well as other geophysical measurements that may be available in respect of the formation under investigation; and the left hand panel 32 lists in mnemonic acronym form all the expressions (labelled in FIG. 2 as "pro_mnemonics") that potentially may be used to calculate UCS and CCS values.

FIG. 2 shows partial completion of a process of allocating input variables from list 31 to equations ("curves") represented in list 32 by the pro_mnemonics on the basis of identity of the input variables of the equations to one or more of the input variables available in or derivable from the log data (signals) or other geophysical measurements as aforesaid.

The GUI of FIG. 2 was produced using a commercially available numerical computing application running on a programmable computer. In the GUI illustrated the allocation of listed input variables to the curves (pro_mnemonics) takes place through a semi-manual "drag and drop" process that is familiar to computer users.

FIG. 2 shows partial completion of this process, that under normal circumstances would not be complete until all the input variables that are capable of being allocated are indeed allocated to the curves in which they are possible parameters. In other embodiments of the method of the invention however it is anticipated that the allocation step illustrated in FIG. 2 can be automated through the writing of an appropriate identity check algorithm that would allocate to the input variables and upon completion determine all the UCS/CCS equations satisfying the available input variable identity criteria.

Figure 3:
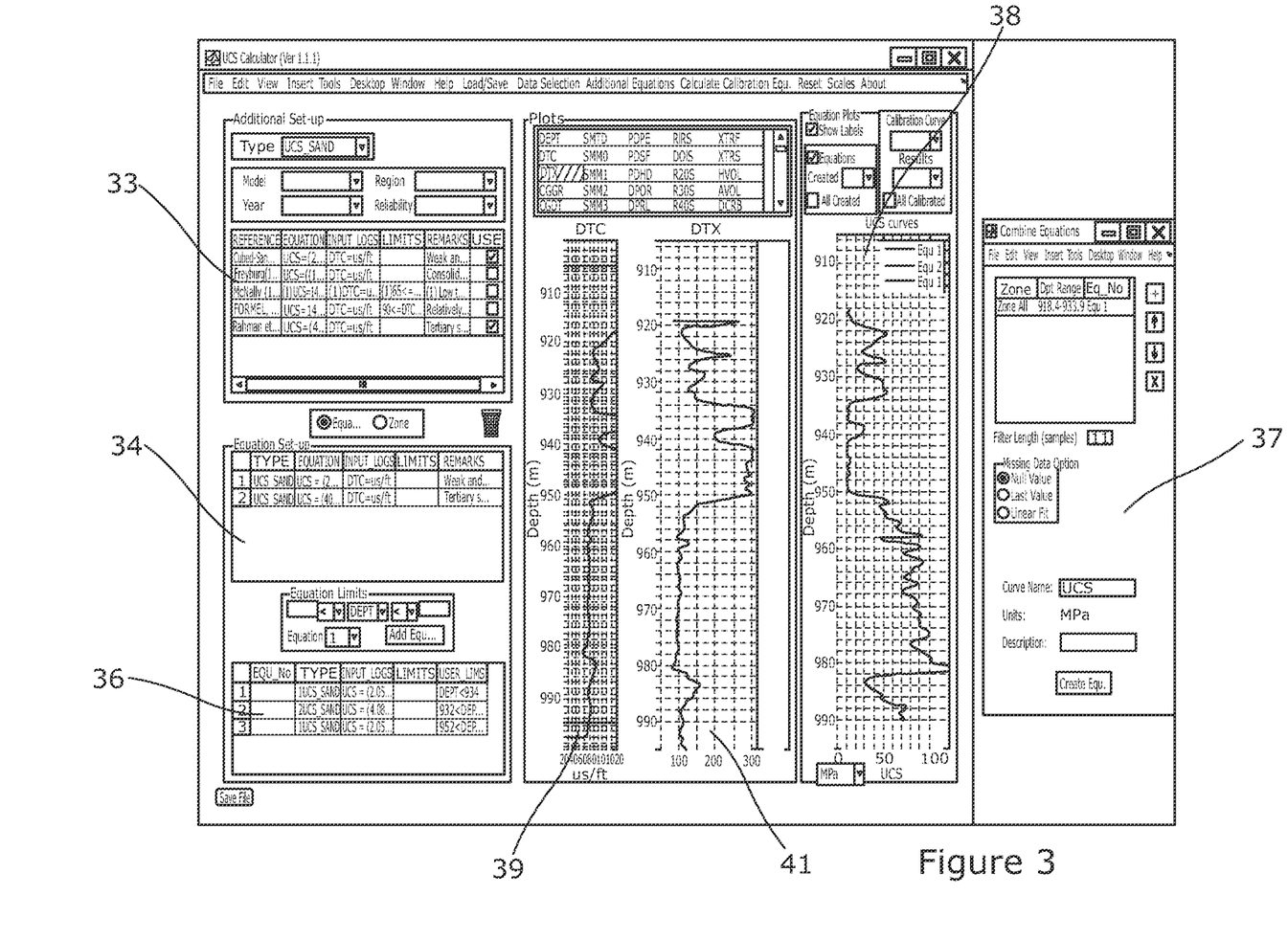
FIG. 3 shows in basic form some steps of the method of the invention that result in the generation of UCS values that are plotted against log (borehole) depth this optional aspect involving a user-defined parametric approach to filtering to give rise to the correct calculation equation at each depth in a borehole.

Such identity criteria may include, e.g., one or more inequality constraints that determine whether the input variables are all present for a given UCS calculation curve; one or more conditional logic statements that determine whether one or more said UCS calculation curve is/are capable of calculating UCS based on the type of input variables; and/or a reliability index that may be applied to filter the allocation of each UCS calculation curve. As noted these steps of the method may readily be automated using a numerical computing application FIG. 3 shows an exemplary next step in the method of the invention, in which equations based on the resulting use of the available input variables as parameters are identified; and from these UCS/CCS equations are shown along with plotted/calculated datasets In FIG. 3 table 33 lists the calculation equations that following the process of calculation equation selection described above is potentially available to the user. In the relatively simple example illustrated five different equations are shown to be available.

Not all of these equations however is likely to be suitable for the particular lithology in which the borehole 18 under investigation is formed or is in the process of being created In the example of FIG. 3 the borehole is being formed in a sandstone. The user knows that only the first and fifth calculation equations are suitable for calculating UCS in sandstone. The user therefore has selected these equations by ticking the check boxes in table 33, thereby causing the chosen equations to show as selected in a selected equations table 34 also visible in FIG. 3

Although in the example shown this stage of the method has been completed using a computer mouse in other embodiments of the invention it may readily be automated.

The two selected equations are accurate at specific borehole depths, and neither of them would be capable of providing accurate UCS values over the entire extent of borehole 18. In order to maximise the UCS calculation accuracy the user in table 36 defines depth boundary parameters at which the equations are to be used. Thus for example the first equation is to be used over a first user-defined borehole depth interval; the second equation over a second user-defined depth interval; the first equation over a user-defined third depth interval and so on until the desired borehole depth is entirely catered for.

In another example of use of the method of the invention a larger number of different calculation equations may be used.

The allocation of differing equations to calculate UCS in different borehole depth zones is likely to result in discontinuities in the UCS values at the transitions between the zones.

The differing equations can however be blended at the zone boundaries through use of the function summarised at box 37 in FIG. 3, which smoothes the transition values of the diverse calculation equations together.

Following selection of the zone boundary value blending step selection of a "calculate" or "create equation" option creates a plot 38 of UCS values over the investigated borehole depth.

The plot 38 represents a blend of the two selected equations in table 34, with the more appropriate being employed in each respective zone. The accuracy with which UCS is calculated is thereby improved over the whole investigated depth.

The GUI and associated software also may calculate other attributes of the rock such as the compressional wave slowness 39 and shear wave slowness 41 illustrated.

Figure 4:
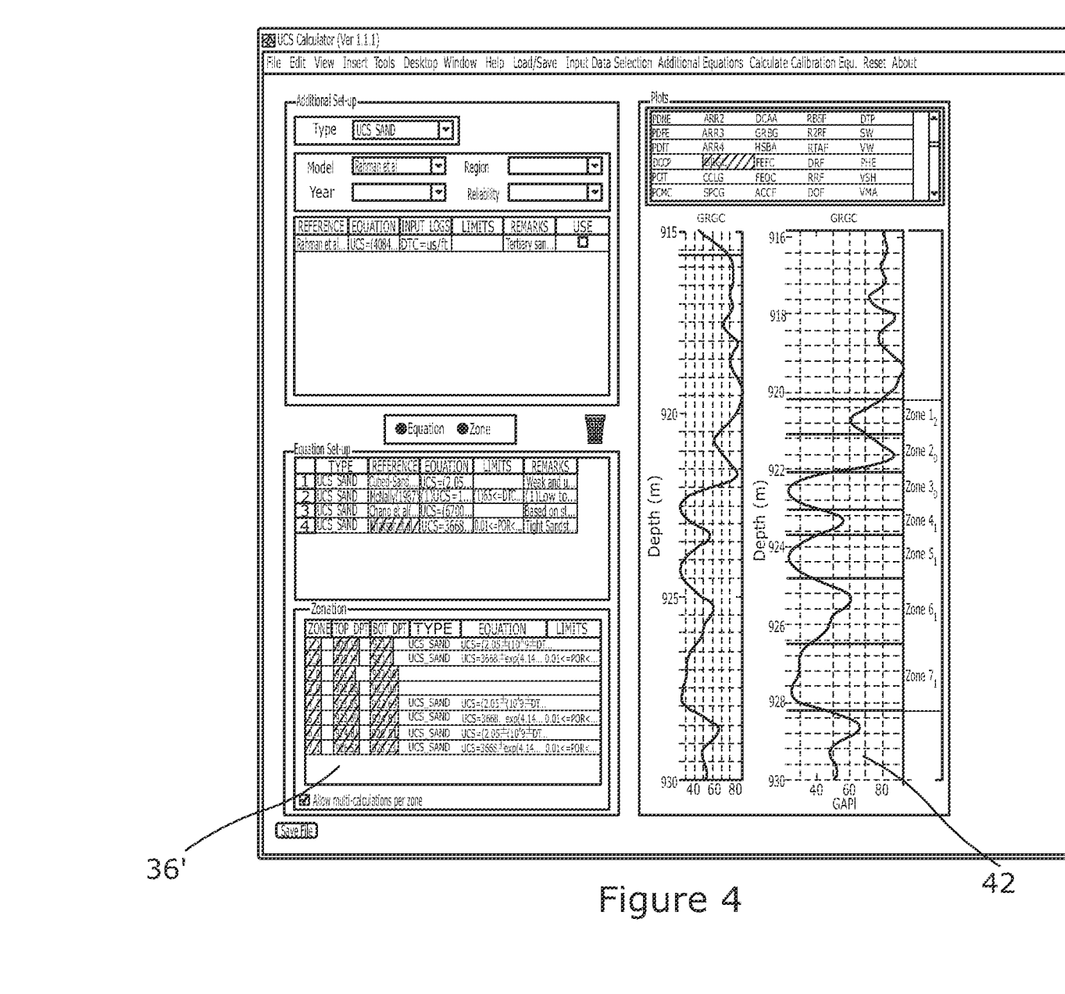
FIG. 4 shows an alternative approach to filtering to give rise to the correct calculating equation at each depth in a borehole, using an approach involving measured or detected formation zone boundaries.

FIG. 4 is similar to FIG. 3, but it represents a different way of defining the zones in which respective calculation equations are to be used.

In particular in the variant of the inventive method shown in FIG. 4 the zone boundaries are determined from log measurements that identify the interfaces between respective zones.

These data are visible in table 36', with graphical representations of the extent of each zone being visible in UCS plot 42 of FIG. 4.

As explained above for a variety of reasons no single equation is likely correctly to describe the UCS of a formation along the entire length of a borehole that has been logged. Moreover as noted a first stage of the method of the invention is likely to result in the generation of multiple UCS plots, each based on a different but available equation, the accuracy of each of which varies depending on the location along the borehole at which it is considered.

An important and unexpected part of the invention therefore is based on the realisation that it is possible to use different equations, from the multiple equations allocated to the input variables, to process log data generated at different locations along the borehole and from this produce a single, composite UCS calculation curve that is a depth-dependent concatenation of a sequence of individual curves resulting from the allocated equations. The accuracy of this single curve over the whole depth of the borehole is significantly better than can be achieved from any one of the initial curve equations of panel 38 when considered on its own depending on the length and type of the formation in question.

Borehole depth and related terms as used herein as is conventional refer to distance along the borehole, and are not intended to imply any particular orientation of a borehole or even that the borehole necessarily extends vertically to any extent at all. Thus the term "borehole depth" may for example refer to distance along a borehole that extends entirely horizontally.

The choice of equation to be used in each zone may be based on a number of criteria and data available. Thus the user may for instance look at other curves not necessarily required for a given UCS/CCS equation to gain an insight into a particular region. As a purely illustrative example of this a gamma ray curve reading of 200 API may signify a shale bed, while a value of 50 API and a PE of 2 marks the region as a sandstone. The result of such filtering is used to determine the calculation equation in each respective lithological zone as described above, and as noted this filtering process may be automated.

Figure 5:
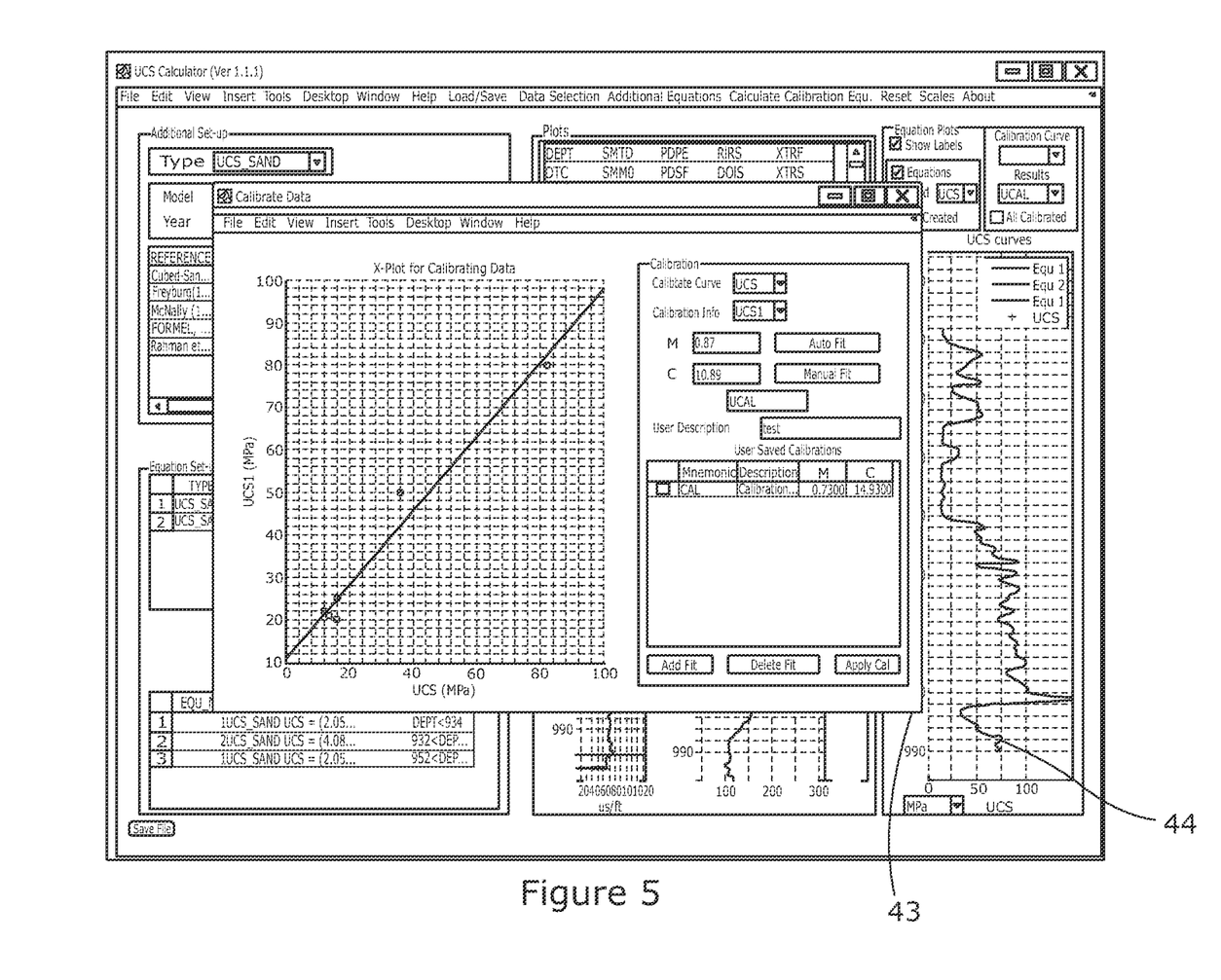
FIG. 5 illustrates a technique of calibration of the resulting calculated UCS values against known field or sample data.

The UCS calculation plots may, as illustrated in FIG. 5, be calibrated against the attributes of e.g. known standard core samples corresponding to the rock type under investigation; or field log data measuring attributes of the formation in a manner regarded as reliable. As an example in the former regard the composite UCS plot of FIG. 4 may be calibrated against core UCS measurements for example, since such measurements are known to be the desired result.

Examples of uncalibrated and calibrated UCS plots are identified respectively by numerals 43 and 44 in FIG. 5. The calibrated plots that result from this step of the method are regarded as more useful than uncalibrated plots since they can be readily compared and combined with other log plots that have been similarly calibrated.

Figure 6:
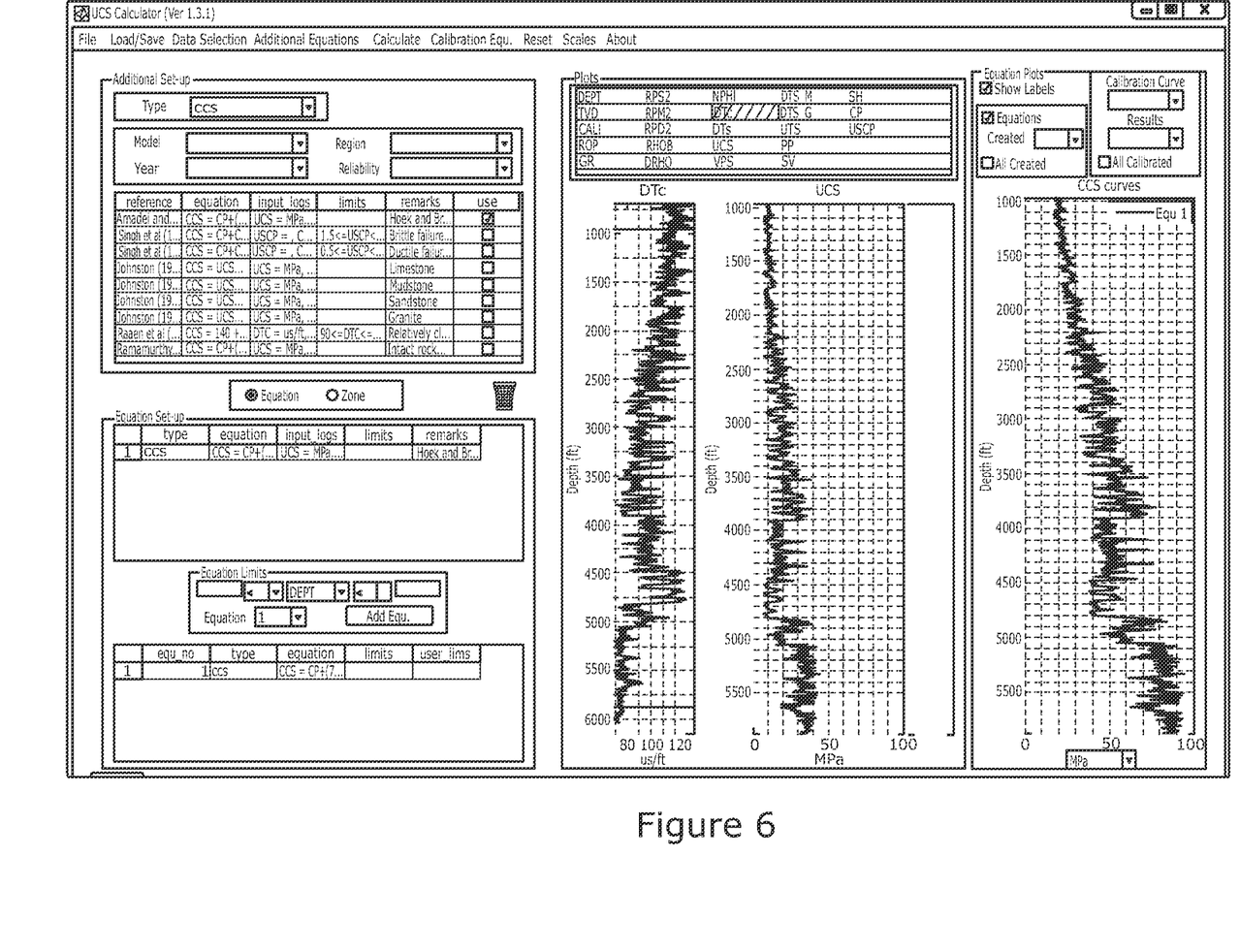
FIG. 6 shows conversion of the results of calculation of UCS values to CCS equivalents, based on prevailing lithology factors.

As a final step in the method of the invention the resulting, highly accurate, composite, calibrated UCS plots may be converted over the logged depth of the borehole to CCS values through the use of additional equations and plotted as indicated in FIG. 6, in which plot 47 represents the CCS-calculated equivalent of the UCS plot 46 resulting from the sequence of steps described with reference to FIGS. 2 to 5.

The method of the invention as a whole greatly improves both the accuracy of UCS and, more pertinently in logging situations, CCS calculations; and does so in a manner that is sufficiently fast and straightforward as to permit its use in conjunction with LWD techniques when this is required.

The invention as noted typically will be put into effect using an appropriately programmed device such as a digital computer (or a network of operationally linked computers). The invention resides in any such computer when programmed to carry out the steps of the method as described or claimed herein. The invention also resides in UCS and/or CCS data calculated, stored, displayed, printed, transmitted or otherwise processed following completion of the method of the invention.

The listing or discussion of an apparently prior-published document in this specification should not necessarily be taken as an acknowledgement that the document is part of the state of the art or is common general knowledge.

The invention claimed is:

1. A method of calculating the unconfined compressive strength (UCS) of subterranean rock having a borehole formed or being formed therein, the method comprising the steps of:
   (a) establishing or accessing a set of input variables pertaining to characteristics of the rock and the geographical region in which the rock exists by operating one or more logging tools in the borehole in order to record log data signals that are the input variables or from which the input variables are derivable; and processing the signals by;
   (b) allocating to each of a plurality of mnemonic types each representing a respective UCS calculation expression and contained within a database of UCS calculation curves up to one said input variable in the form of a data element or up to one series of said input variables in the form of a data curve the allocation taking place on the basis of identity of each said input variable or data curve, as applicable, to which a said UCS calculation curve is allocated to a variable of a said UCS calculation curve (herein "curve variables");
   (c) dividing the set of allocated UCS calculation curves according to one or more respective zones of the rock to which they pertain and calculating a resultant curve;
   (d) as necessary filtering the resulting set of UCS calculation curves to reduce the number of allocated UCS calculation curves to a single UCS calculation curve for each zone;
   (e) repeating step (d) in respect of any further said zones of the rock;
   (f) when step (d) is repeated one or more times, combining the resulting single curves allocated to the respective zones so as to create a composite UCS calculation curve; and
   (g) using the composite UCS calculation curve to calculate UCS values at one or more locations in the borehole.

2. The method according to claim 1, including the steps of (h) of developing a confined compressive strength (CCS) curve from the composite UCS calculation curve, and (i) using the CCS curve to calculate CCS values at one or more locations in the borehole.

3. The method according to claim 1, including the step of (j) storing, printing, transmitting or displaying a resulting UCS curve or a resulting CCS curve or (j) calibration information one or more both UCS and/or CCS curves.

4. The method according to claim 1, wherein the step of operating one or more logging tools occurs while drilling of the borehole also takes place.

5. The method according claim 1, wherein the step (b) includes one or more of:
   (b1) assigning the up to one said input variable in the form of a data element or a series of said input variables in the form of a data curve to each of a plurality of mnemonic types each representing a respective measurement type;
   (b2) comparing a list of available internal mnemonic data with the mnemonic types required for each UCS calculation expression;

(b3) determining whether all required mnemonic types are present and if so adding the UCS calculation expression to a list of valid expressions which can be used to calculate UCS;

(b4) based on a populated mnemonic type database resulting from step (b3), calculating any other possible data measurements which can be used in UCS calculation expressions;

(b5) using between zero and three conditional logic statements to establish whether one or more said UCS calculation expressions is/are valid in calculating UCS in an environment of interest; and (b6) using a reliability index in relation to the allocation of each UCS calculation curve in order to rank the quality of the UCS expressions.

6. The method according to claim 5, wherein the reliability index includes one or more measure of scale factor low, medium and high reliability of each said calculation equation.

7. The method according to claim 1, the step of (b7) calibrating through the use of a least square fit one or more said allocated UCS calculation curves against core and/or field data.

8. The method according to claim 1, including the step of (b7) calibrating through the use of a least square fit one or more said allocated UCS calculation curves against core and/or field data; and including the step of (b8) plotting at least one said allocated UCS calculation curve before and after modification, and comparing, storing, displaying or printing the plotted curves.

9. The method according to claim 1, wherein the step (c) of dividing the set of input variables according to one or more respective zones of the rock to which they pertain includes defining one or more zone boundaries dependent on variations in one or more measured parameters of rock.

10. The method according claim 1, wherein the step (c) of dividing the set of input variables according to one or more respective zones of the rock to which they pertain includes defining one or more zone boundaries dependent on variations in one or more calculated or selected parameters of rock.

11. The method according to claim 1, including applying one or more inequality constraints to one or more calculated UCS values.

12. The method according to claim 1 including the steps of (h) of developing a confined compressive strength (CCS) curve from the composite UCS calculation curve, and (i) using the CCS curve to calculate CCS values at one or more locations in the borehole; and including applying one or more inequality constraints to one or more calculated CCS values.

13. The method according to claim 1, wherein one or more said calculated UCS values is input in real time or near-real time into a drilling calculation selected from the list including wellbore stability, wellbore trajectory and wellbore strengthening.

14. The method according to claim 1, wherein one or more said calculated UCS values is input in real time or near-real time to a determination of hydraulic fracture stage locations in a region of rock.

15. The method according to claim 1, wherein one or more said calculated UCS values is input in real time or near-real time to a determination selected from drill bit selection and drilling efficiency.

16. The method according to claim 1, the steps of which are performed while drilling of the rock is taking place.

17. The method according to claim 1 including the steps of (h) of developing a confined compressive strength (CCS) curve from the composite UCS calculation curve, and (i) using the CCS curve to calculate CCS values at one or more locations in the borehole, wherein one or more said calculated CCS values is input in real time or near-real time into a drilling calculation selected from the list including wellbore stability, wellbore trajectory and wellbore strengthening.

18. The method according to claim 1, including the steps of (h) of developing a confined compressive strength (CCS) curve from the composite UCS calculation curve, and (i) using the CCS curve to calculate CCS values at one or more locations in the borehole, wherein one or more said calculated CCS values is input in real time or near-real time to a determination of hydraulic fracture stage locations in a region of rock.

19. The method according to claim 1, including the steps of (h) of developing a confined compressive strength (CCS) curve from the composite UCS calculation curve, and (i) using the CCS curve to calculate CCS values at one or more locations in the borehole, wherein one or more said calculated CCS values is input in real time or near-real time to a determination selected from drill bit selection and drilling efficiency.

20. The method according to claim 1, including the step of (k) calculating one or more values of stress based on rock formation anisotropy.

21. The method according to claim 1, including the step of (l) updating the database of UCS calculation curves based on the results of any preceding claim.

22. The method according to claim 1, when carried out using one or more programmed computer.

23. The method of claim 1, in which a programmable computer is programmed to carry out the method.

24. A programmable computer for calculating the unconfined compressive strength (UCS) of subterranean rock having a borehole formed or being formed therein, the programmable computer being configured to:

(a) establish or access a set of input variables pertaining to characteristics of the rock and the geographical region in which the rock exists from log data signals, which are the input variables or from which the input variables are derivable, obtained by operating one or more logging tools in the borehole;

(b) allocate to each of a plurality of mnemonic types each representing a respective UCS calculation expression and contained within a database of UCS calculation curves up to one said input variable in the form of a data element or up to one series of said input variables in the form of a data curve the allocation taking place on the basis of identity of each said input variable or data curve, as applicable, to which a said UCS calculation curve is allocated to a variable of a said UCS calculation curve (herein "curve variables");

(c) divide the set of allocated UCS calculation curves according to one or more respective zones of the rock to which they pertain and calculating a resultant curve;

(d) as necessary filter the resulting set of UCS calculation curves to reduce the number of allocated UCS calculation curves to a single UCS calculation curve for each zone;

(e) repeat step (d) in respect of any further said zones of the rock;

(f) when step (d) is repeated one or more times, combine the resulting single curves allocated to the respective zones so as to create a composite UCS calculation curve; and
(g) use the composite UCS calculation curve to calculate UCS values at one or more locations in the borehole.

\* \* \* \* \*